United States Patent [19]
Harenberg, Jr. et al.

[11] 3,789,356
[45] Jan. 29, 1974

[54] MONITOR DISPLAY MEANS

[75] Inventors: Harold L. Harenberg, Jr., Long Beach; James H. Shannon, Westminster, both of Calif.

[73] Assignee: McDonnell Douglas Corporation, Santa Monica, Calif.

[22] Filed: July 10, 1972

[21] Appl. No.: 270,379

Related U.S. Application Data

[63] Continuation-in-part of Ser. No. 77,557, Oct. 2, 1970, abandoned.

[52] U.S. Cl............................ 340/27 NA, 343/108 R
[51] Int. Cl................................................ G08g 5/02
[58] Field of Search .. 340/25, 27 NA, 27 AT, 27 R; 343/108 R, 108 M, 108 SM

[56] References Cited
UNITED STATES PATENTS

| | | | |
|---|---|---|---|
| 3,668,622 | 6/1972 | Gannett et al. | 340/27 R |
| 3,605,083 | 9/1971 | Kramer | 340/27 NA |
| 3,521,227 | 7/1970 | Congleton et al. | 340/27 R |
| 3,439,321 | 4/1969 | Sebern | 340/27 R |
| 3,309,659 | 3/1967 | Balding | 340/27 NA |
| 3,037,382 | 6/1962 | Aid et al. | 340/27 NA |

Primary Examiner—Kathleen H. Claffy
Assistant Examiner—Randall P. Myers
Attorney, Agent, or Firm—George W. Finch; Walter J. Jason; Donald L. Royer

[57] ABSTRACT

A cockpit display for indicating the assessments made by a performance and failure assessment monitor of the overall performance of an automatic flight control system or of the pilot during the landing maneuver. The display processes signals from the monitor and operates thereon to display a representation of the runway, the expected landing point thereon and the relative uncertainty that the aircraft will land on the predicted spot. After landing the display may show the position of the aircraft on the runway and the expected lateral excursion thereof plus a discrete display of the distance the aircraft will travel before it can be stopped. Other discrete displays are also provided at critical times either to compliment the normal display or in substitution therefor.

11 Claims, 19 Drawing Figures

MONITOR DISPLAY MEANS

CROSS-REFERENCE TO RELATED APPLICATIONS

This application is a continuation-in-part of copending U.S. Pat. application Ser. No. 77,557, filed on Oct. 2, 1970, and now abandoned, by Harold L. Harenberg, Jr. and James H. Shannon entitled MONITOR DISPLAY MEANS.

This application also relates to the subject matter of copending U.S. Pat. application entitled PERFORMANCE AND FAILURE ASSESSMENT MONITOR, Ser. No. 78,073, filed Oct. 5, 1970, now U.S. Pat. No. 3,678,256 which issued July 18, 1972 and Paper No. 690,672 presented to the Society of Automotive Engineers at the National Aeronautic and Space Engineering and Manufacturing Meeting, Los Angeles, California, Oct. 6 through 10th, 1969, entitled DEVELOPMENT OF THE DC-10 AUTOMATIC LANDING MONITOR by Harold L. Harenberg, Jr. and James H. Shannon, coinventors of the present display means. Reference is made to the information therein as though fully set forth hereinbelow.

BACKGROUND OF THE INVENTION

Annunciators and/or display means in aircraft for indicating that portions of the aircraft are operating improperly are well known including those which indicate the acceptability of the operation of an automatic landing system during a landing maneuver. These display means, an example of which can be found in R. C. Sebern, U. S. Pat. No. 3,439,321, have been found unsatisfactory when displaying a monitor assessment of complex flight control systems since they only indicate that some specific portion of the system is operating incorrectly and make suggestions as to proper corrective action. The nature of such display means is that they come on with no warning to the pilot so that he is only informed of an existing emergency and not that an emergency may soon exist. Also, such display means only inform the pilot that the mechanical and electrical portions of his aircraft systems seem to be operating properly and convey no explicit information regarding the likely success of the maneuver in progress. Therefore, pilots have expressed distrust for the more complex flight control systems because the monitor display means therefor do not instill confidence. As a result, automatic landing systems on aircraft do not get the use that their cost demands.

SUMMARY OF THE INVENTION

The present display means are for inferfacing the pilot to an indepth assessment of his aircraft flight control and navigation systems by means such as the monitor disclosed in the referenced patent application entitled PERFORMANCE AND FAILURE ASSESSMENT MONITOR. Such a monitor is connected to literally hundreds of inputs from sensors throughout the aircraft. The monitor operates on these inputs to generate signals representative of the position of the aircraft with respect to the runway, the expected touchdown point with relation to the runway and the uncertainties involved with the predicted touchdown point. The monitor also includes means for triggering discrete displays when the uncertainties and predicted touchdown point get out of predetermined bounds. These signals are all sent to the present display means. Therefore, the present display means include means that operate on the signals generated in the monitor to correlate and display them in a fashion which is meaningful to the pilot. The actual display may be placed on the face of a cathode ray tube (CRT) or it may be generated by a mechanical display or any other suitable flat, heads-up, or 3-dimensional display.

No matter what kind of display device is used, the display includes a runway with a preferred landing area indicated thereon. As the aircraft approaches the actual runway, the display runway is moved in correlation thereto. The predicted touchdown point is displayed on the runway to indicate the expected touchdown point. Also included on the display are vertical and horizontal arms or other means extending away from the predicted touchdown point. The length of the arms indicate the relative uncertainty of the touchdown point in the four directions of concern.

If a rollout option is included in the associated monitor, the position of the aircraft on the runway after landing is shown by the position of a vertical line while the predicted lateral excursion of the aircraft on the runway is indicated by the length of one or the other horizontal arms. Along with the runway, the position of the aircraft thereon and the lateral excursion prediction, the distance required to stop the aircraft is also displayed to the pilot.

If at any time the predicted touchdown point, the uncertainties involved therewith or the excursion of the aircraft on the runway exceed takeover thresholds as determined in the monitor, discrete indications are displayed to warn the pilot of such a takeover condition. Discrete indications are also provided to advise the pilot what is the best procedure to follow in either continuing a safe flight or a safe landing.

The symbology of the display conveys the assessment output of the performance monitor to the pilot of the aircraft in such a manner as to enhance his confidence in the progress and the likely success of the landing maneuver. It also provides a quantitative indication of a deteriorating situation by displaying increasing uncertainty so that the pilot is prewarned of a takeover condition and it also serves to inferface the pilot with the automatic landing process in a general manner. There is no known device with an equivalent display function because there are no known devices which make an overall assessment of the aircraft landing performance as is done in the above referenced monitor.

The display means disclosed herein has the advantage of presenting a single integrated display of quantitative information relative to a very complex ongoing process in such a manner that no subjective interpretation is required to grasp the meaning of the displayed intelligence. Presently known devices do not provide a display of the same depth of relevancy nor do they provide a widely encompassing assessment in a single display nor do they provide a quantitative indication which is not subject to arbitrary interpretation as to its implacations regarding the probable success of the completion of the maneuver in progress.

It is therefore an object of the present invention to provide display means for interfacing the pilot of an aircraft to the operation of his automatic landing systems through an assessment device.

Another object is to provide display means which display only absolutely essential information to the pilot and thereby relieve him of subjective interpretation of nuisance annunciator warnings.

Another object is to provide display means for continuously displaying the probable success of an impending landing and the available alternatives so that the probability of a safe landing or approach is maximized.

These and other objects and advantages of the present display means will become apparent after considering the following detailed specification which covers pertinent portions thereof in conjunction with the accompanying drawings wherein:

DESCRIPTION OF THE SHOWN EMBODIMENT

Figure 1:
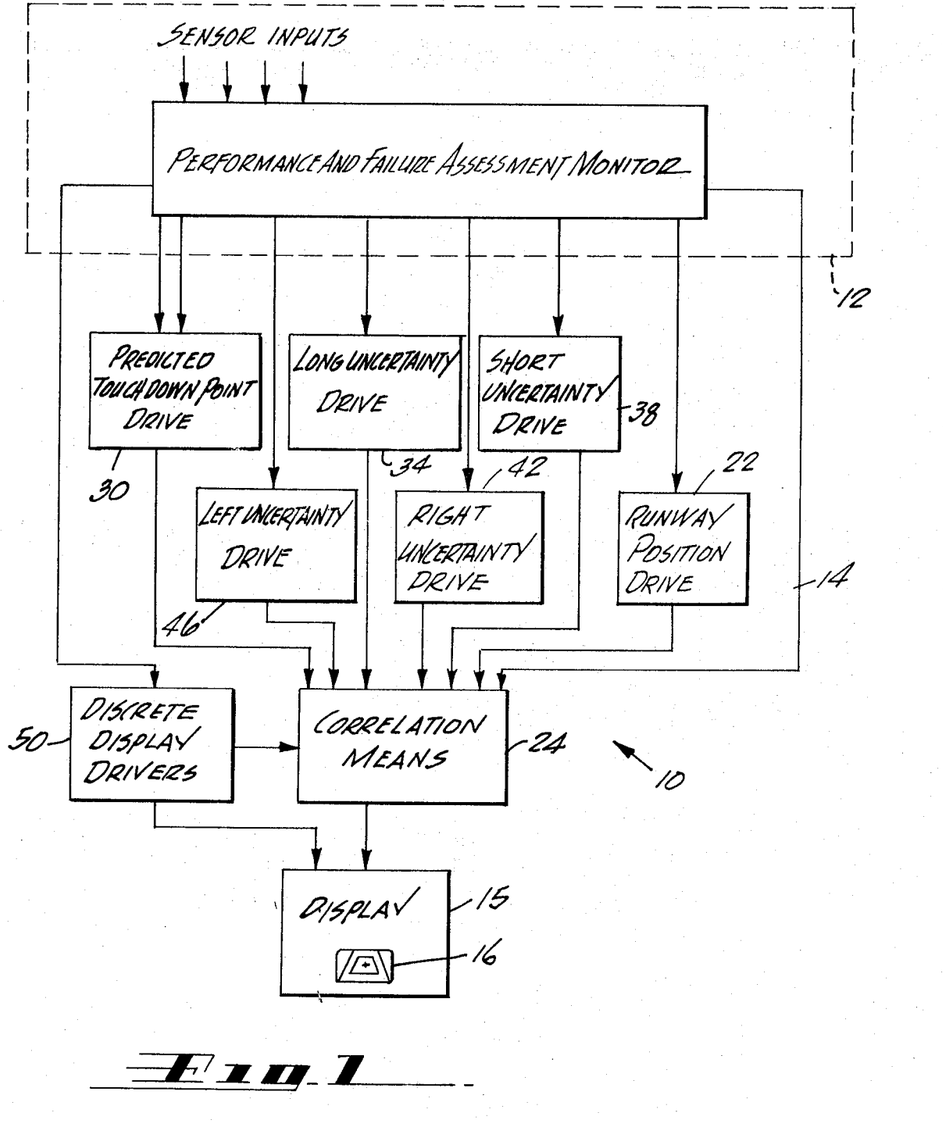
FIG. 1 is a block diagram of the present display means connected to a performance and failure assessment monitor.

Referring to the drawings more particularly by reference number, number 10 in FIG. 1 refers to display means of the present invention which are connected to a performance and failure assessment monitor 12 enclosed in dotted outline. The display means 10 are used to display to the pilot of the aircraft the performance and the failure assessments made by the monitor 12 with regard both to the operational availability of systems on the aircraft and how those systems are performing to assist the pilot landing the aircraft. In this regard the monitor 12 may be assessing either a landing being made by an automatic landing system of the aircraft or a manual landing being made by the pilot.

When the monitor 12 is turned on by the pilot or by automatic switching, it energizes the display means 10 by means of a control line 14 interconnecting the monitor 12 with the display means 10.

The display means 10 upon being energized performs a self test function to determine if means 10 is operating properly. Thereafter the display means 10 displays the runway and cross symbology shown in FIG. 2 on the face of the display device 15 which is shown as including a cathode ray tube (CRT) 16.

Figure 2:
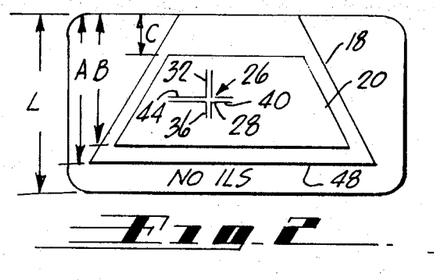
FIGS. 2 through 7 are representative of displays of the present display means during various phases of a landing and rollout maneuver of an aircraft.

As shown in FIG. 2 the normal display during an approach to landing includes a representation of a runway 18 having a preferred touchdown area 20 marked thereon. The runway symbol 18 with its touchdown area 20 is moved downward in proportion to the position of the aircraft and the actual runway so that in an idealized form, the runway 18 on the face of the CRT 16 looks like what the pilot would see if he was looking out the window of the aircraft during the approach. The vertical positioning of the runway 18 on the face of the CRT 16 is determined by a signal from the monitor 12 which is representative of the distance the aircraft is actually away from the runway. This signal, R, is sent to a runway position drive 22 which operates therewith to generate the parameters A, B and C; and by means of the equations:

$$A = [(4,000/R)] [(L/2)] + (L/2)$$

$$B = (2,400/R) (0.567L) + 0.433L$$

$$C = 0.37B \text{ for } B \leq L$$

$$C = 0.315 \times 10^{-3} (2,400-R) + 0.37 L \text{ for } B > L$$

The parameters A, B, and C and L are shown in FIG. 2.

The output parameters A, B, and C of the runway position drive 22 are sent to correlation means 24 which can be innumerable devices including a properly programmed general purpose computer. The correlation means 24 apply the parameters A, B, and C to the display device 15 which operates to have the runway 18 appear on the face of the CRT 16. The correlation means 24 also use the runway parameters from runway position drive 22 to modify the various other indications displayed on the face of the CRT 16 as will be described hereinafter.

As shown, the runway position drive 22 only causes the runway indication 18 on the face of the CRT 16 to move downward and enlarge and no means are shown to laterally offset the runway 18 if for instance the aircraft is not in line with the actual runway. This is intentional so that the pilot will not use the display as a flight instrument but will use it only as an indication of the operation of the monitored aircraft systems. Signals are available however, in the monitor 12 which would allow the runway position drive 22 to laterally displace the runway if that is required. It is also contemplated that when independent sources of position data become available, such as television or radar displays, such information may be used either in conjunction, substitution, or alternately with the present runway display 18.

Also displayed on the face of the CRT 16 is a cross 26 which presents the independent parameters, predicted touchdown point and right, left, long and short uncertainty of the prediction. The touchdown point parameter is represented by the center 28 of the cross 26 with respect to the symbolic runway 18. The positioning of the center 28 of the cross 26 is accomplished by means of a predicted touchdown point drive 30 to which lateral and longitudinal predicted touchdown points are fed from the monitor. The predicted touchdown point drive 30 operates on these prediction signals and sends them to the correlation means 24. The correlation means 24 correlate the touchdown point with respect to the position of the runway and feed the information to the display device 15 for display of the face of the CRT 16.

The upper sector 32 of the cross 26 represents the long uncertainty of the predicted touchdown point 30. It is generated by means of a long uncertainty drive 34 which converts a long uncertainty signal from the monitor 12 into a signal for use in the correlation means 24. The correlation means 24 in turn correlate the signal with the predicted touchdown point and the position of the runway for display on the face of the CRT 16.

Similarly the lower sector 36 of the cross 26 is generated by means of a short uncertainty drive 38, the right sector 40 by means of a right uncertainty drive 42 and the left sector 44 by means of a left uncertainty drive 46.

In a mechanical display device, the uncertainty drives 34, 38, 42 and 46, the predicted touchdown point drive 30 and the runway position drive 22 are used to drive interconnected servos which move the mechanical portions thereof.

Figure 7:
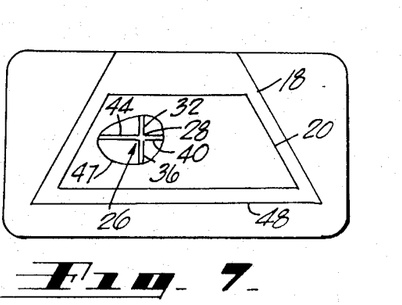

By properly programming the correlation means 24, it is possible to display the certain touchdown area 47 in conjunction or substitution for the predicted touchdown point 28 and/or the uncertainties involved therewith, as shown in FIG. 7. The area 47 is bounded by calculating a curve which in perspective is perpendicular to the ends of the sectors 32, 36, 40 and 44 and is the root sum square therebetween.

Looking at the display shown in FIG. 2, it can be determined from the position of the threshold 48 of the runway that the aircraft is about halfway down the glidescope during a landing maneuver. The center 28 of the cross 26 by being slightly to the left on the runway 18 shows that the predicted touchdown point of the aircraft is slightly left of the center line of the runway. The extended lengths of the upper and left sectors 32 and 44 of the cross 26 show that there are less than ideal conditions present and that there is uncertainty involved with the predicted landing point especially to the left and further along down the runway. Since the sectors 32 and 44 do not extend outside the preferred landing area 20 there is no cause for alarm and the pilot upon seeing such a display would continue the landing advised that conditions were less than ideal.

Also shown in FIG. 2 is the discrete display NO ILS. This discrete symbology is applied to the face of the CRT 16 by discrete display drivers 50 upon the receipt of information from the monitor 12 that some component of the Instrument Landing System is not operative. Therefore the pilot should be prepared to take corrective action if the condition does not correct itself. Such discrete symbologies can be displayed either through the use of flags or by programming of the discrete display drivers 50 and/or the correlation means 24 which apply the information to the display device 15 for the use on the face of the CRT 16.

Figure 3:
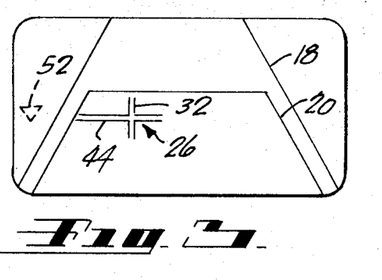

FIG. 3 shows the symbology displayed on the face of the CRT 16 just before touchdown of the aircraft on the runway. As can be seen by comparing FIG. 2 to FIG. 3, the threshold 48 of the runway is no longer visible as it has past underneath the aircraft whereas the center 28, the cross 26 indicating the predicted touchdown point, has moved toward the upper lefthand corner of the preferred landing area 20. Also the upper sector 32 and the left sector 44 representative respectively of long and left uncertainty almost extend out of the preferred landing area. This warns the pilot that if conditions continue to deteriorate he should be prepared to take over the landing maneuver.

Also shown in dotted outline in FIG. 3 is a small triangle 52 which is generated by the discrete display drivers 50 upon touchdown of the aircraft. This is to inform the pilot that he is on the ground since in some aircraft this determination is difficult to make.

Figure 4:
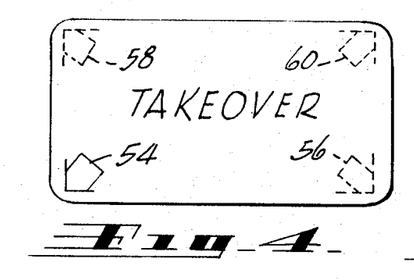

If the uncertainty of the prediction becomes so large that a sector of the cross 26 extends beyond the preferred landing zone 20, a signal is sent from the monitor 12 to the discrete display drivers 50 which generate the TAKEOVER display shown in FIG. 4. At the same time the discrete display drivers 50 send a signal to the correlation means 24 to turn off the normal runway display. When the pilot is informed to TAKEOVER control of the aircraft, one or more arrows are displayed on the face of the CRT 16 in the corners thereof. The appearance of arrow 54 in the lower left-hand corner of the display indicates that the pilot should take over and continue the landing, while arrow 56, appearing in the lower right-hand corner, would indicate that the co-pilot should take over and continue the landing. Whether the arrow 54 or 56 or for that matter both arrows are shown when TAKEOVER is displayed depends upon the monitor's assessment of the flight instruments in front of the pilot and co-pilot respectively. If both sets of flight instruments are displaying good information or information degraded to the same amount, both arrows 54 and 56 are displayed. Optionally in such an event, the arrow 54 indicating the pilot should take over can be displayed alone. If the arrow 58 or 60 appears in the upper left or righthand corner of the display respectively, this indicates again whose flight instruments are a better representation of the actual state of the aircraft and that a go-around rather than a landing should be made. The appearance of any of the arrows 54, 56, 58 or 60 is controlled through the discrete display drivers 50 by means of signals from logic within the monitor 12.

Under certain circumstances when insufficient positional information is being supplied to the aircraft the monitor 12 will generate a signal to cause the discrete display drivers 50 to display NO TRACK on the face of the CRT 16. This is indicative that the ILS capture maneuver of the aircraft has failed. If the pilot thereafter takes no action, the monitor 12 causes the discrete display drivers 50 to display TAKEOVER as is done when any hazardous condition is sensed.

Figure 5:
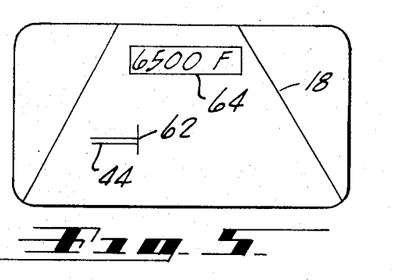
Figure 6:
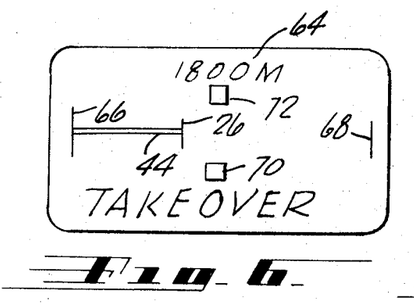

FIGS. 5 and 6 show the symbology used in the present means 10 if the monitor 12 is equipped to monitor the rollout of the aircraft on the runway after landing. The rollout symbology includes the runway 18 but since the preferred landing area 20 no longer has any meaning after the aircraft has landed, it is removed from the display by the correlation means 24 as the aircraft travels beyond the area 20. The outputs from the long and short uncertainty drives 34 and 38 are also disabled since this information no longer has any meaning after landing. The correlation means 24 thereafter causes a vertical line 62 of a fixed length to be displayed on the runway to inform the pilot of his lateral position thereon. The sectors 40 and 44 from the right and left uncertainty drives 42 and 46 respectively, are retained to display to the pilot whether the predicted lateral excursions of the aircraft are within allowable limits. In FIG. 5, existance of the left-hand sector 44 shows a possible excursion to the left.

By using an output of the monitor 12, the discrete display drivers 50 also cause the distance 64 required to stop the airplane to be displayed at the position shown. The letter F behind the distance indication 64 in FIG. 5 and the letter M in FIG. 6 indicate that the distance indication is feet or meters respectively.

FIG. 6 shows the symbology applied to the face of the CRT 16 when a takeover condition is encountered during the rollout. The takeover logic signal from the monitor 12 is sent to the discrete display drivers 50 causing them to generate the TAKEOVER command for display at the bottom of the face of the CRT 16. At the same time the discrete display drivers 50 send signals to the correlation means 24 causing certain aspects of the display to be changed so that it immediately becomes obvious to the pilot that a critical situation has occurred. Such a takeover as shown in FIG. 6 would probably be triggered by a failure of the automatic rollout guidance system. When the TAKEOVER command is generated by the discrete display drivers 50 during a rollout, the signals sent to the correlation means 24 also cause vertical lines 66 and 68 to be displayed on the CRT 16 indicative of the sides of the runway but in a different manner from the runway symbology to warn him of the critical condition as aforesaid. Small blocks 70 and 72 are also displayed to give the pilot a runway center line steering reference to which he can compare the cross 26.

Figure 8:
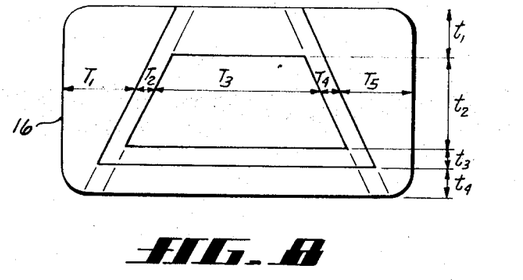
FIG. 8 is a representation of the face of the display with runway display parameters thereon.

As aforesaid, the correlation means 24 can include many different devices and FIGS. 9, 10, 11, 13 and 14 disclose typical means in the correlation means 24 suitable to provide the desired display wherein it is assumed the cathode ray tube 16 is color responsive to anode voltage. Such tubes are available from Sylvania Electronics, San Jose, California. The face of this tube 16 is shown in FIG. 8 in which $T_1$, $T_2$, $T_3$, $T_4$, $T_5$, $t_1$, $t_2$, $t_3$, and $t_4$, are example parameters used to generate the runway display. In the example five colors will be used: black, green, yellow, orange and red., with the basic sequence being a green field raster and then green field vector, a yellow field raster and then a yellow field vector, an orange field raster and then an orange field vector, and a red field raster and a red field vector. This sequence is desirable because the colors produced in response to voltage follow the same sequence as the voltage is increased.

Figure 9:
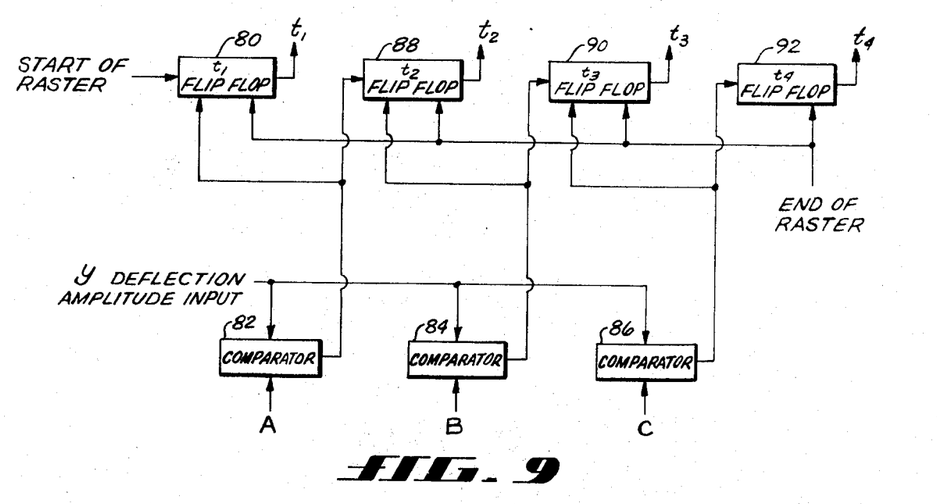
FIG. 9 is a diagram of a circuit for generating the horizontal parameters of FIG. 8.

FIG. 9 shows a diagrammatic circuit of means to generate $t_1$, $t_2$, $t_3$, and $t_4$. A start of raster signal is fed to $t_1$ flipflop 80 which changes state and produces a $t_1$ signal. At the same time, the Y deflection amplitude input to the CRT 16 is fed to comparators 82, 84, and 86 which compare the Y deflection amplitude input to the parameters A, B, and C discussed with regard to FIG. 2. As the Y deflection gradually builds up, a comparison is made in the comparator 82 and the comparator 82 produces an output which causes flipflop 80 to return to its original state ceasing the $t_1$ output. The output of comparator 82 also is fed to $t_2$ flipflop 88 to change its state and turn on a $t_2$ output. When the Y deflection amplitude input compares with B, comparator 84 produces an output which turns off $t_2$ by returning flipflop 88 to its original state and changes the state of $t_3$ flipflop 90 to turn on a $t_3$ output. Likewise, when C compares to the Y deflection amplitude input comparator 86 produces an output to return the flipflop 90 to its original state ceasing the $t_3$ signal. At the same time, it feeds an input to a $t_4$ flipflop 92 to commence a $t_4$ signal. In addition, an end of raster input is fed to all the flipflops 80, 88, 90 and 92 at the end of the raster period to assure that all flipflops are returned to their initial conditions.

Figure 10:
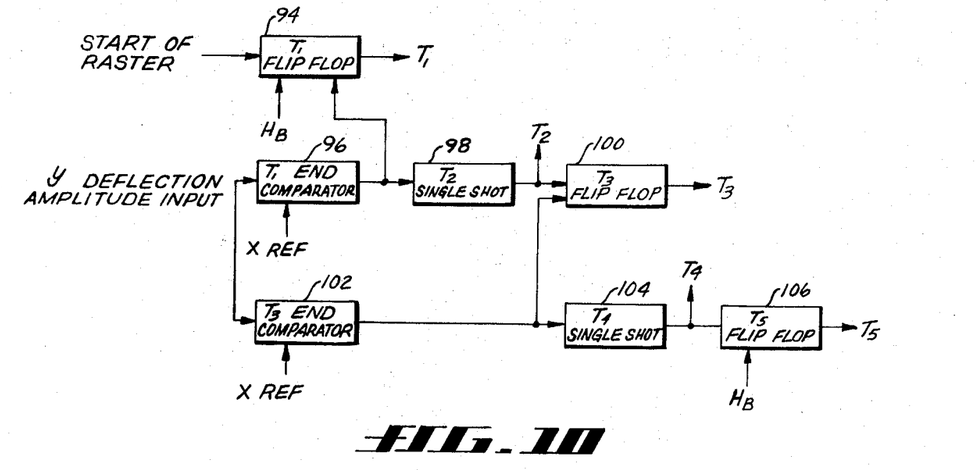
FIG. 10 is a diagram of a circuit for generating the vertical parameters of FIG. 8.
Figure 11A:
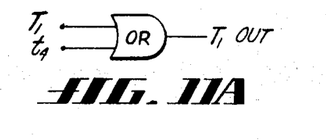
FIGS. 11A through 11E are logic circuits used to combine the parameters generated by the circuits of FIGS. 9 and 10.
Figure 11B:
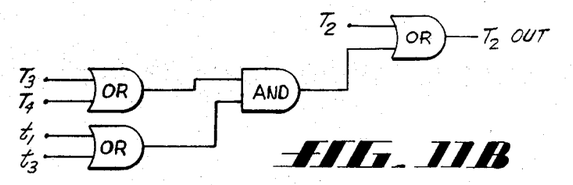
Figure 11C:
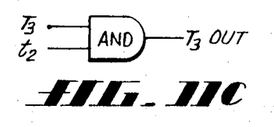
Figure 11D:
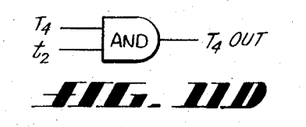
Figure 11E:
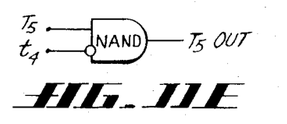

FIG. 10 shows a circuit capable of generating $T_1$, $T_2$, $T_3$, $T_4$, and $T_5$ signals in which a $T_1$ flipflop 94 is fed a start of raster signal to change its condition and produce a $T_1$ signal. The Y deflection amplitude input is fed to a $T_1$ end comparator 96 which is also fed an $x$ deflection reference voltage, the reference voltage being chosen to control the angle of the psuedo three dimensional effect of the runway being displayed on the CRT 16. When the Y deflection amplitude input equals the reference voltage, the comparator 96 produces an output which returns the flipflop 94 to its original state thereby ceasing the $T_1$ signal thereof. The output of the comparator 96 is also fed to a $T_2$ single shot 98 which produces a $T_2$ signal of a predetermined duration. $T_2$ is fed to a $T_3$ flipflop 100 which responds to the end of $T_2$ by changing state and producing a $T_3$ output. The Y deflection amplitude is also fed to a $T_3$ end comparator 102 which, like comparator 96, compares the Y deflection amplitude input to an $x$ reference voltage. When a comparison is made, comparator 102 produces an output to return the flipflop 100 to its original state thereby ceasing the $T_3$ signal. At the same time, the comparator 102 sends a signal to a $T_4$ single shot 104 which produces a $T_4$ signal of a predetermined duration. $T_4$ is fed to a $T_5$ flipflop 106 which produces a $T_5$ signal at the end of $T_4$. A horizontal blanking signal $H_b$ is applied to flipflop 94 and 106 to turn off $T_5$ and to start the cycle again by turning on $T_1$ as the blanking signal $H_b$ is turned off.

Figure 12:
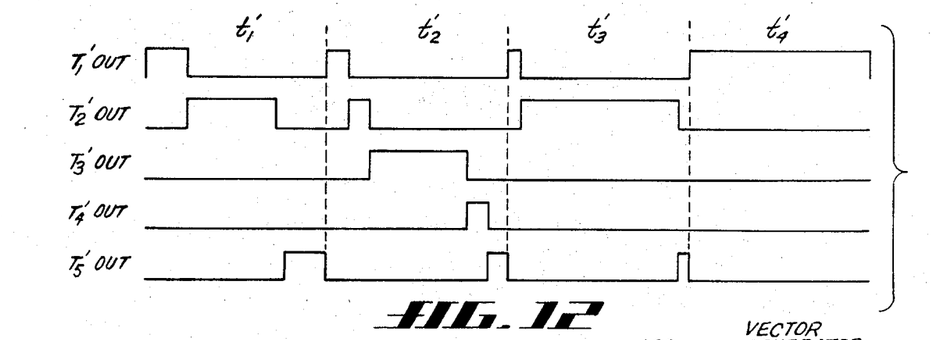
FIG. 12 shows typical outputs of the circuits of FIGS. 11A through 11E.

As shown in FIGS. 11A through 11E, the signals produced by the circuits shown in FIGS. 9 and 10 are passed through appropriate logic circuits to generate $T_1$ out, $T_2$ out, $T_3$ out, $T_4$ out and $T_5$ out. FIG. 12 shows the outputs of the logic circuits of FIG. 11 at arbitrary times designated as $t_1'$, $t_2'$, $t_3'$, and $t_4'$. By connecting the $T_1$ out, $T_2$ out, $T_3$ out, $T_4$ out and $T_5$ out, outputs though "and" logic with a suitable color signal from color control (not shown), a multicolored runway of the desired shape can be represented on the CRT 16.

Figure 13:
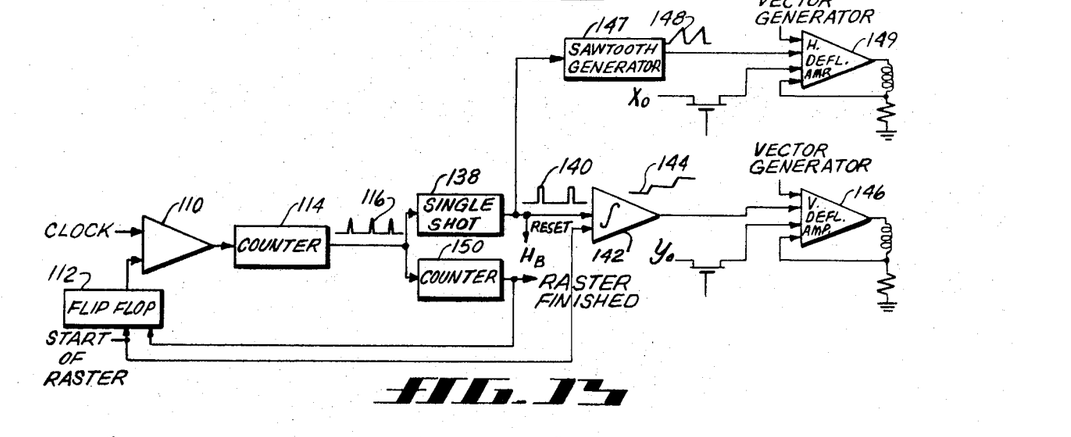
FIG. 13 is a diagram of a circuit for generating a raster.

The raster itself can be generated by a circuit such as shown in FIG. 13 wherein clock pulses, which can be obtained from the monitor 12 or generated internally within the correlation means 24, are fed to an amplifier 110. The amplifier 110 is turned on by a flipflop 112 which is energized by a start of raster signal. The amplifier 110 passes the clock pulses to a counter 114 which, in response to the clock signals, produces an output wave form 116 shown. The output wave form 116 which is a series of spikes at intervals controlled by the counter is fed to a single shot circuit 138 whose output 140 is a series of predetermined pulses and corresponds with the spikes of the wave form 116. The wave form 140 forms the horizontal blanking $H_b$ signals used throughout the display. The horizontal blanking signals are also fed to an integrating amplifier 142 which produces the staircase function 144 which is fed to the vertical deflection amplifier 146 to cause the vertical deflection in the CRT 16. The integrator 142 also includes a connection to the start of raster signal as it is reset. The wave form 140 is fed to a saw tooth generator 147 also to produce the wave form 148 which is fed to the horizontal deflection amplifier 149 of the CRT 16. The wave form 148 causes a forward sweep and a flyback during the horizontal blanking signal in the CRT 16. The wave form 116 is also transmitted to a counter 150 which counts the number of spikes in the wave form 116 and at a predetermined number, produces an output signaling the end of the raster. This raster finish signal is fed back to the flipflop 112 to return it to a nonconducting condition and stop the raster.

Figure 14:
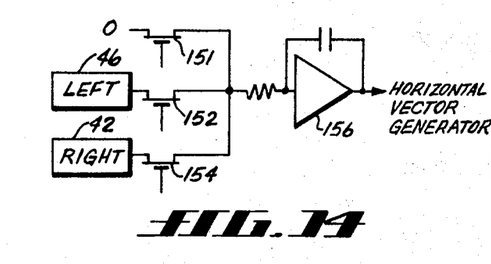
FIGS. 14 and 15 are diagrams of circuits to produce vector writing on a display.
Figure 15:
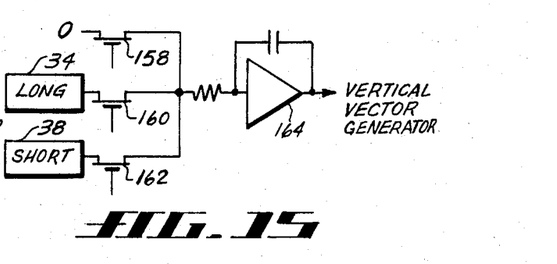

It should be noted that the deflection amplifiers 149 and 146 also include $x_o$ and $y_o$ inputs which are inputs from the predicted touchdown point drive 30. Once the raster of the desired color is finished, vector writing may be used to generate the cross 26. The $x_o$ and $y_o$ signals establish the center of the cross and then vector writing is used to establish the arms of the cross. This can be done by circuitry such as shown in FIGS. 14 and 15. When it is desired to generate a cross, gates 151, 152 and 154 are sequenced. The gate 151 connects a zero voltage to an integrating amplifier 156 causing it to reset and produce a nominal zero output. Then gate 152 is opened, enabling a voltage from the left uncertainty drive 46 to be fed to the integrating amplifier. The integrating amplifier 156 thereby produces a ramp voltage which is applied to the horizontal deflection amplifier 149 to cause horizontal movement of the electron beam to produce the left arm of the cross. After the gate 151 is cycled to reset the integrator 156, the gate 154 is sequenced, enabling a voltage from the right uncertainty drive 42 to be applied through the integrating amplifier 156 to cause deflection of the beam to the right generating the right hand arm of the cross in proportion to the amount of uncertainty. In a like manner, the circuit of FIG. 15 is sequenced by turning on and off gates 158, 160, 158 and 162, thereby enabling an integrating amplifier 164 similar to amplifier 156 to produce the long and short arms of the cross 26. Means similar to FIGS. 14 and 15 in combination with a binary memory and discrete switches can be used to produce the discrete alphanumeric displays discussed above.

It can therefore be seen that means have been provided for simply depicting the overall assessment of a complicated going on process in a simple display format which is meaningful and non-subjective. The application of the display techniques described not only alert a pilot to hazardous conditions but also encourage confidence in the operation when it is justified. This is done by replacing prior art raw data indicators with a unified display that embodies implicit recognition of factors that affect the success of the maneuver rather than indicators which merely identify the violation of arbitrary limits for various internal parameters of systems on the aircraft.

Thus there has been shown and described novel display means which fulfill all the objects and advantages sought therefore. Many changes, modifications, variations and other uses and applications of the subject display means will, however, become apparent to those skilled in the art after considering the specification and the accompanying drawings. All such changes, modifications, alterations, and other uses and applications which do not depart from the spirit and scope of the invention are deemed to be covered by the claims which follow.

What is claimed is:

1. Display means for an aircraft performance and assessment monitor which produces outputs which are predictions of the future touchdown point of an aircraft on a runway and the possible instant errors involved therewith, said display means including:
    at least one display device;
    means connected to the monitor outputs for displaying on said display device a representation of the runway;
    means connected to the monitor outputs for displaying the predicted touchdown point on said runway representation; and
    means connected to the monitor outputs visually displaying an area about said predicted touchdown point in which touchdown is certain at that time instant so that the area of probable touchdown is defined thereby.

2. The display means defined in claim 1 wherein said means for displaying a representation of the runway include:
    means connected to the monitor outputs to cause said runway representation to move on said display device as a function of the distance between the aircraft and the runway.

3. The display means defined in claim 2 wherein said runway moving means include:
    means to correlate the runway representation movement with said predicted touchdown point so that the said predicted touchdown point moves on said display device with said runway representation.

4. The display means defined in claim 1 wherein said means for displaying a representation of a runway include:
    means for displaying a preferred landing area on said runway representation.

5. The display means defined in claim 1 wherein said means for displaying said predicted touchdown point and said means for displaying the area of probable touchdown include means for generating and positioning a cross on said runway representation, said cross having vertical and horizontal arms, whereby said predicted touchdown point is indicated by the center of said cross, the lengths of said vertical arms represent the longitudinal area of probable touchdown about said predicted touchdown point, and the lengths of said horizontal arms represent the lateral area of probable touchdown about said predicted touchdown point.

6. The display means defined in claim 1 wherein the aircraft monitor produces outputs which are representative of the position of the aircraft when the aircraft is on the runway and outputs which predict the future lateral excursions of the aircraft on the runway, said display means including:
    means to display the position of the aircraft on said runway representation which include means for generating and positioning a vertical line with respect to said runway representation whereby said vertical line indicates the position of the aircraft on the runway; and
    means to display the predicted lateral excursion of the aircraft with respect to said runway representation which include means for generating a horizontal line extending away from said vertical line whereby, the length and direction of said horizontal line indicate the predicted lateral excursion of the aircraft on the runway.

7. The display means defined in claim 6 wherein the aircraft monitor produces outputs which are representative of the predicted distance the aircraft will travel down the runway before stopping, said display means including:

discrete symbology means responsive to the distance outputs of the monitor to display a readout of the distance on said display device.

8. A method of displaying on display means the outputs of an aircraft performance and assessment monitor which are predictions of the future touchdown point of the aircraft on a runway and the maximum amount of error that can be in the prediction of the future touchdown point at that time instant, said method including the steps of:

generating a runway on the display means;

displaying the predicted touchdown point with respect to the represented runway; and displaying the area about the predicted touchdown point into which the touchdown is certain at that time instant, the outer limits of which area represent said maximum amount of error.

9. The method defined in claim 8 including the step of:

displaying a preferred landing area on said runway representation.

10. The method defined in claim 8 wherein said step for displaying the area about the predicted touchdown point into which the touchdown is certain at that time instant includes the substeps of:

displaying a line which passes through the displayed predicted touchdown point in alignment with the represented runway, the length of said line beyond and before the displayed predicted touchdown point indicating the longitudinal distance from the displayed predicted touchdown point in which touchdown is certain at that time instant; and displaying a line which passes THROUGH the displayed predicted touchdown point at right angles to the represented runway, the length of said line to the sides of the displayed predicted touchdown point indicating the lateral distance from the displayed predicted touchdown point in which touchdown is certain at that time instant.

11. The method defined in claim 8 wherein the aircraft monitor produces outputs which are representative of the position of the aircraft on the runway and outputs which are representative of predicted future possible lateral excursion of the aircraft including the steps of:

displaying a first line in alignment with the runway representation whose lateral position corresponds to the lateral position of the aircraft on the runway;

displaying a second line perpendicular to the first line and extending away therefrom, the length and direction of extension of said second line indicating the predicted future possible lateral excursion of the aircraft on the runway.

* * * * *